United States Patent [19]
Lapinski

[11] Patent Number: 5,788,834
[45] Date of Patent: Aug. 4, 1998

[54] CATALYTIC CRACKING PROCESS WITH Y ZEOLITE CATALYST COMPRISING SILICA BINDER CONTAINING SILICA GEL

[75] Inventor: Mark P. Lapinski, Baton Rouge, La.

[73] Assignee: Exxon Research and Engineering Company, New Jersey, N.J.

[21] Appl. No.: 684,523

[22] Filed: Jul. 19, 1996

[51] Int. Cl.$^6$ .......................... C10G 11/00; C10G 11/02
[52] U.S. Cl. .......................... 208/118; 208/113; 208/119; 208/121
[58] Field of Search .................. 208/113, 118, 208/119, 121

[56] References Cited

U.S. PATENT DOCUMENTS

| | | | |
|---|---|---|---|
| 4,287,048 | 9/1981 | Gladrow et al. | 208/120 |
| 4,415,438 | 11/1983 | Dean et al. | 208/120 |
| 4,938,863 | 7/1990 | Degnan et al. | 208/120 |
| 5,055,176 | 10/1991 | Herbst et al. | 208/120 |

OTHER PUBLICATIONS

A. A. Avidan. FCC is far from being Mature Technology. Oil & Gas Journal, 90(10), 59–67 (1992).

P. Sheertukde, G. Marcelin, G. Sill, W.K. Hall. Study of the Mechanism of the Cracking of Small Alkane Molecules on HY Zeolites. Journal of Catalysis, 136, 446–462 (1992).

J.S. Magee, W.E. Cormier, G.M. Woltermann. Octane Catalysts Contain Sieves. Oil & Gas Journal, May 27, 1985, 59–64.

*Primary Examiner*—Glenn Caldarola
*Assistant Examiner*—In Suk Bullock
*Attorney, Agent, or Firm*—James H. Takemoto

[57] ABSTRACT

A catalytic cracking catalyst and catalytic cracking process for cracking the 650° F.+ portion in a heavy feed to lighter products. The catalytic cracking catalyst contains a Y zeolite in a silica binder that is substantially free of catalytically active alumina. The silica binder contains silica gel as a component.

8 Claims, 1 Drawing Sheet

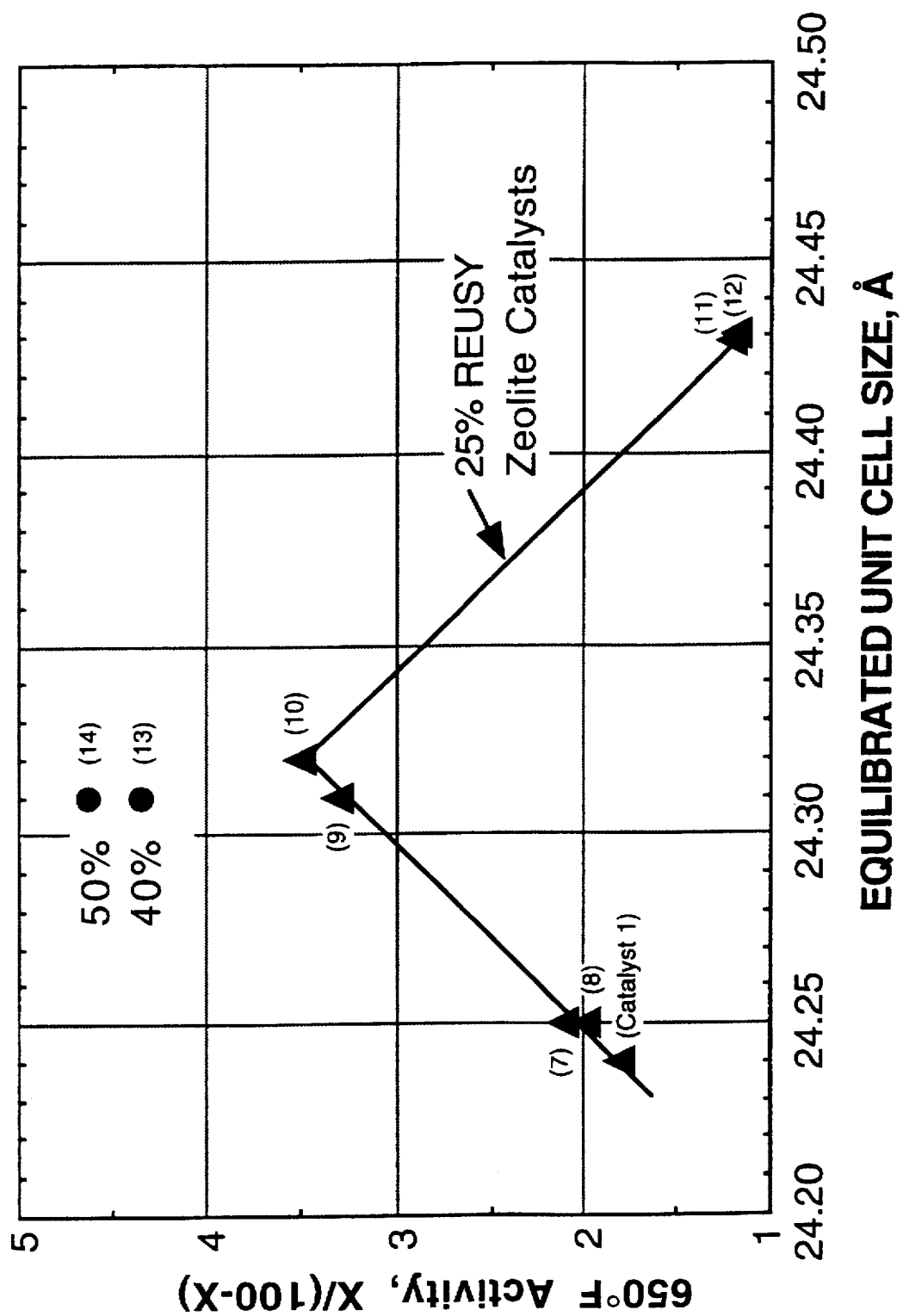

CATALYTIC CRACKING PROCESS WITH Y ZEOLITE CATALYST COMPRISING SILICA BINDER CONTAINING SILICA GEL

FIELD OF THE INVENTION

This invention relates to the catalytic cracking of heavy hydrocarbon feeds. More particularly, heavy hydrocarbon feeds are cracked under conditions which maximizes bottoms conversion activity and provides optimum coke and naphtha selectivity.

BACKGROUND OF THE INVENTION

Fluidized Catalytic Cracking (FCC) is a well known process for converting heavy hydrocarbon feeds to lighter products. Most FCC units include a reactor and a regenerator in the fluid solids portion of the overall FCC process. The movement of catalyst between the reactor and regenerator represents a cyclical process. Heavy hydrocarbon feed is contacted with hot catalyst in the reactor to produce lighter products. During the cracking process, carbonaceous deposits or coke and other contaminants such as metals are deposited on the catalyst resulting in at least a partial deactivation of the catalyst. The deactivated catalyst is separated from the lighter products and sent to a regenerator. The coke deposits are removed from catalyst particles by burning and the regenerated catalyst recycled to the reactor. Heat from the burning coke is typically used to help maintain the desired temperature in the reactor where additional cracking of feed occurs.

There is a growing need to utilize resids or resid-containing streams as feeds to FCC units because such streams are lower cost as compared to more conventional FCC feeds such as gas oils and vacuum gas oils. However, these types of heavy feeds have not been considered desirable because of their high Conradson Carbon (con carbon) content together with high levels of metals such as sodium, iron, nickel and vanadium. Nickel and vanadium lead to excessive "dry gas" production during catalytic cracking. Vanadium, when deposited on zeolite catalysts can migrate to and destroy zeolite catalytic sites. High con carbon feeds lead to excessive coke formation. These factors result in FCC unit operators having to withdraw excessive amounts of catalyst to maintain catalyst activity. This in turn leads to higher costs from fresh catalyst make-up and deactivated catalyst disposal. Because of these types of problems, FCC operators limit the amounts of resids present in the FCC feed to about 5 to 10 wt. %.

Some technologies are available, notably hydrotreating, to reduce the metals and con carbon of resid feeds prior to cat cracking. However, their efficiencies are not very high and the technologies are very costly, generally requiring high pressure equipment and a large hydrogen supply. As noted by A. A. Avidan in Oil Gas J., 90(10), 59–67 (1992), there are at least two major schools of thought in designing commercial resid FCC catalysts. The first approach stresses the importance of tailoring zeolite-to-matrix activity ratio. Increasing matrix activity increases bottoms conversion, but at some point, undesired high coke and dry gas make become predominant. The second approach stresses the importance of tailoring matrix alumina type and pore size distribution.

A third approach is described in U.S. Pat. No. 4,938,863 wherein a rare earth exchanged ultra stable Y zeolite catalyst (REUSY) is incorporated in an alumina-free binder. If the matrix contains alumina, it can be coated with an alumina-free layer or shell. The catalyst is intended for use with heavy, vanadium-containing feeds, and is stated to avoid the problems associated with vanadium by creating a catalyst surface in which materials which could act as vanadium "sinks" are eliminated. The process combines the cracking catalyst which consists of zeolite coated with silicas or in a binder of silica with a getter additive that has a greater affinity for vanadium than for the cracking catalyst.

It would be desirable to develop a FCC catalyst and FCC process which is capable of handling FCC feeds containing substantial amounts of high boiling materials while providing optimum selectivity to coke and naphtha production.

BRIEF DESCRIPTION OF THE INVENTION

This invention relates to a catalytic cracking process for cracking the 650° F. (343° C.)+ portion in a heavy feed to lighter products while providing improved coke selectivity which comprises: contacting the heavy feed with a catalytic cracking catalyst under catalytic cracking conditions wherein the catalytic cracking catalyst comprises a Y zeolite in a silica binder that is substanially free of catalytically active alumina and which contains silica gel as a matrix component.

In another embodiment there is provided a FCC catalyst for cracking the 650° F. (343° C.) + portion in a heavy feed which comprises: a Y zeolite in a silica binder that is substantially free of catalytically active alumina and which contains silica gel as a matrix component. This catalyst provides optimum coke, naphtha and $C_2$- dry gas selectivities and is preferably a rare earth exchanged ultra-stable Y zeolite.

BRIEF DESCRIPTION OF THE DRAWINGS

FIG. 1 is a plot of bottoms activity vs. hydrothermally equilibrated zeolite unit cell size for a REUSY catalyst.

DETAILED DESCRIPTION OF THE INVENTION

The FCC catalyst and process according to the invention utilizes a FCC catalyst containing a Y zeolite, preferably an ultra-stable Y zeolite, more preferably a rare-earth exchanged ultra-stable Y zeolite and a silica gel dispersed in a silica binder substantially free of catalytically active alumina. While any Y zeolite may be used in the present catalysts, it is preferred to utilize ultra-stable Y (USY) zeolites and rare-earth exchanged ultra-stable Y zeolites due to their resistance to thermal degradation and steam treatment.

Any crystalline aluminosilicate zeolite having catalytic cracking activity can be used in the practice of this invention. Such zeolite materials are described in U.S. Pat. Nos. 3,660,274 and 3,944,482, both of which are incorporated herein by reference. Non-limiting examples of such zeolites which can be employed in the practice of this invention, include both natural and synthetic zeolites. These zeolites include zeolites of the structural types included in the "Atlas of Zeolite Structural Types" edited by W. M. Meier and D. H. Olson and published by the Structure Commission of the International Zeolite Association in 1987 and also included herein by reference. Preferred are the faujasites, more preferred are zeolites X and Y, which are faujasite-type zeolites, and most preferred is zeolite Y. The term faujasite-type, as used therein, means those zeolites isostructural to faujasite.

Zeolites typically have silica-to-alumina mole ratios ($SiO_2/Al_2O_3$) of at least about 3 and uniform pore diameters from about 4 to 15 Angstroms. Zeolites as produced or found in nature normally contain an alkali metal cation, such as sodium and/or potassium and/or an alkaline earth metal cation, such as magnesium and/or calcium. When used as a hydrocarbon cracking catalyst component, it is usually necessary to decrease the alkali metal content of the crystalline zeolite to less than about 5 wt. %, preferably less than about 1 wt. %, and more preferably less than about 0.5 wt. %. The alkali metal content reduction, as is known in the art, may be conducted by exchange with one or more cations selected from the Groups IB through VIII of the Periodic Table of Elements (the Periodic Table of Elements referred to herein is given in *Handbook of Chemistry and Physics*, published by the Chemical Rubber Publishing Company, Cleveland, Ohio, 45th Edition, 1664), as well as with hydrogen cations or hydrogen precursors, e.g., $NH_4+$, capable of conversion to a hydrogen cation. Preferred cations include rare earths, calcium, magnesium, hydrogen and mixtures thereof. Ion-exchange methods are well known in the art and are described, for example, in U.S. Pat. Nos. 3,140,249; 3,142,251 and 1,423,353, the teachings of which are hereby incorporated by reference. The concentration of the hydrogen cation in the finished catalyst is the difference between the theoretical exchange capacity of the particular zeolite and the number of equivalents of rare earths, alkaline earths, and alkali metals actually present. The particle size of the zeolite component may range from about 0.1 to 10 microns, preferably from about 0.5 to 3 microns.

Ultrastable Y zeolite catalysts are well known in the art and are described in U.S. Pat. No. 3,402,996 and J. Phys. Chem., 1968, 22, 2594. USY zeolite catalysts are prepared by known methods such as base-exchanging a Y-type zeolite with an aqueous solution of a salt such as an ammonium salt. The base-exchanged zeolite is then calcined. This cycle is successively repeated until the desired alkali metal content is achieved. This sequence of ion exchange and heat treatment and concurrent reduction in alkali metal content of the zeolite results in unit cell shrinkage which is believed to account for the ultrastable properties of the resulting zeolite. USY zeolites have an alkali metal content between about 0.4 to 4 wt. % and a silica-to-alumina mole ratio in the range of 3.5 to 7 or greater.

REUSY zeolites have a hydrothermally equilibrated unit cell size between 24.25 and 24.53 angstroms as determined by X-ray diffraction calculated by ASTM method D 3942. Rare earths are incorporated into the ultrastable Y zeolites by ion exchange. The rare earths include cerium, lanthanum, praseodymium, neodymium, promethium, samarium, europium, gadolinium, terbium, dysprosium, holmium, erbium, yttrium, thulium, scandium, lutecium and mixtures thereof. Preferred rare earths include lanthanum, cerium and neodymium. The rare-earth oxides may range from 0 to 10 wt. %, preferable 0 to 7 wt %, based on the zeolite component of the catalyst. The preparation of rare-earth exchanged ultrastable Y zeolites is described in Oil & Gas Journal, May 27, 1985, pages 59–64.

The zeolitic component is incorporated into a binder or matrix material. The matrix material contains silica gel and silica sol and is essentially free of active alumina. Silica gels and silica sols are different forms of amorphous silica. A silica sol is a stable dispersion of fine, colloid-sized particles of non-porous amorphous silica in an aqueous medium. Silica sols do not gel even upon prolonged storage and have substantially uniform particle sizes ranging from about 20 to 1000 angstroms, preferably 40 to 200 angstroms. The term "substantially uniform" as used herein with respect to particle size means that at least 80%, preferably at least 90% of the particles have a particle size from about 0.5D to 1.5D where D is the mean particle diameter. Silica sols are available commercially, and are high purity silica sols containing greater that 95% silica, preferably greater than 99% silica and more preferably greater than 99.5% silica.

Silica gels have a three-dimensional, continuous structure and are classified as regular density, intermediate density and low density gels. These types of silica gels are distinguished based on their particle size, pore volumes and surface areas. Silica gels useful in the present invention have particles sizes in the range 30–500 microns, preferably 40–150 microns, pore diameters in the range 100 to 500 Angstroms, preferably 150 to 300 Angstroms and surface areas of 100 to 700 $m^2/g$, preferably 150 to 500 $m^2/g$.

The present catalyst compositions include from 1 to 99 wt. % zeolite, based on the catalyst composition, preferably 15 to 50 wt. %, from 1 to 50 wt. % silica gel, based on the catalyst composition, preferably 5 to 40 wt. %, and an amount of silica sol sufficient to bind the catalyst components in the finished catalyst. The binder or matrix material should be substanially free of catalytically active alumina. By "substantially free" is meant that the matrix material contains less than about 3 wt. %, based on matrix material, of active alumina, preferably less than 1 wt. %. Current FCC catalysts have catalytically active matrices containing alumina wherein large molecules are pre-cracked on the active matrix to form intermediate products that are further cracked on the zeolite. The matrix according to this invention may also contain other catalytically inert components such as clays and diatomaceous earth.

In conducting the catalytic cracking operation, utilizing the catalyst of this invention, the temperature employed ranges from about 750° F. (399° C.) to about 1300° F. (732° C.), preferably from about 900° F. (482° C.) to about 1050° F. (566° C.), and the pressure employed is one ranging from about 0 psig to about 150 psig, preferably from about 0 psig to about 45 psig. Suitably, catalyst-to-oil ratios in the cracking zone used to convert the feed to lower boiling products are not more than about 30:1, and may range from about 20:1 to about 2:1, preferably from about 4:1 to about 9:1. The catalytic cracking process may be carried out in a fixed bed, moving bed, ebullated bed, slurry, transfer line (dispersed phase) or fluidized bed operation. Suitable regeneration temperatures include a temperature ranging from about 1100° to about 1500° F. (593° to 816° C.), and a pressure ranging from about 0 to about 150 psig. The oxidizing agent used to contact the partially deactivated (i.e., coked) catalyst will generally be an oxygen-containing gas such as air, oxygen and mixtures thereof. The partially deactivated (coked) catalyst is contacted with the oxidizing agent for a time sufficient to remove, by combustion, at least a portion of the carbonaceous deposit and thereby regenerate the catalyst in a conventional manner known in the art.

Suitable hydrocarbonaceous feeds for the catalytic cracking process of the present invention include heavy feeds such as gas oil, heavy hydrocarbonaceous oils comprising materials boiling above 1050° F. (566° C.), heavy and reduced petroleum crude oil, petroleum atmospheric distillation bottoms, petroleum vacuum distillation bottoms; pitch, asphalt, bitumen, other heavy hydrocarbon residues, tar sand oils, shale oil, liquid products derived from coal liquefaction processes, and mixtures thereof. If the heavy feed is mixed with lighter oils, the present invention is directed to cracking the 650° F. (343° F.)+ portion of the feed mixture.

Since heavy feeds contain vanadium that can migrate to the zeolite during catalyst regeneration and destroy the zeolite, the current catalyst, although not required, may be combined with vanadium trap additives that are commercially available to mitigate zeolite destruction. The additives are preferred to be separate particles but can also be feed-soluble additives or additives that are incorporated into the catalyst particles during preparation such as $BaTiO_3$, $SrTiO_3$ and rare earth oxides.

If no vanadium additives are used, other methods to reduce vanadium zeolite destruction can be employed. One such method is avoiding full combustion of coke in the regenerator. Partial combustion leaves small amounts of coke on the catalyst but limits vanadium mobility by maintaining vanadium in a reduced oxidation state (see, e.g., U.S. Pat. No. 4,377,470).

The present invention can also be combined with other processes that remove nickel and vanadium from the FCC unit by chemical reaction or magnetic separation. The DEMET process is an example in which depositied nickel and vanadium are removed from the catalyst and the catalyst is returned to the unit. In magnetic separation, the highest metal containing particles (lowest activity) are removed whereas the lower metal particles (highest activity) are returned to the unit.

The present invention can also be combined with Ni and/or sodium passivator additives and/or metal traps or other processes that will reduce the detrimental effects of these contaminants.

The invention is further illustrated by the following non-limiting examples which also illustrate a preferred embodiment of the invention.

EXAMPLE 1

This example is directed to the preparation of various zeolite-containing FCC catalysts with silica matrices. Four types of Y zeolites were used: USY (Union Carbide LZY-82), chemically-dealuminated ultrastable Y (Union Carbide LZ-210), rare earth exchanged USY (LZY-82) and calcined rare earth exchanged Y (CREY, Davison). To prepare the rare earth exchanged USY, LZY-82 zeolite was slurried at 50° C. with a solution of lanthanum nitrate (96 g in 2 L), stirred for 1 hr. and then decanted. The solids were again slurried with more lanthanum nitrate solution, stirred, filtered and then washed with water several times. Following overnight drying in an oven at about 150° C., the zeolite was calcined at about 540° C. for 2 hr. Each of the above zeolites were incorporated into a silica matrix by the general procedure below.

The zeolite was well mixed with LUDOX monodispersed silica sol (Dupont, 99.8% silica) and silica gel in specific cases and added to a heated (65° C.) solution of 5% ammonium sulfate. The solution pH was adjusted to 6.5 using ammonium hydroxide, stirred for about 0.5 hr. and filtered. The sequence was repeated two more times. After the final filtering, the catalyst was washed with hot water, dried in an oven overnight and calcined at about 540° C. for 3 hr. After calcining, the catalyst was crushed if necessary and sieved through an 80 mesh (177 μm) screen. The sieved material was calcined at about 540° F. for 1 hr. followed by steaming at 1 atm at 760° C. for 16 hr. Catalyst particles smaller than 44 μm were removed from the finished catalyst prior to testing with a petroleum feedstock.

EXAMPLE 2

This example illustrates the advantage of adding a silica gel to the matrix of a catalyst made with USY and a high-purity silica binder. Using the methods of Example 1, a series of catalyst were prepared with 25 wt % USY zeolite in silica matrices with and without silica gel. Two silica gels were obtained from PQ Corp. and consisted of 99.8%+ silica with small impurities of $Na_2O$, CaO, MgO and $Al_2O_3$ (less than 300 ppm). The surface areas were 200 and 410 m²/g, 92%+ of the particles were greater than 44 μm and the average pore diameters were about 200 and 250 Å. An additional catalyst was made using a diatomaceous earth (IMSIL, Illinois Mining Co.) which is a low surface area silica (less than 1 m²/g). The finished catalysts are described in Table 1.

TABLE 1

| Catalysts contain 25% USY and: | Catalyst | Equilibrated Surface Area m²/g cat | Equilibrated Unit Cell Size Å | Sodium wt % |
|---|---|---|---|---|
| 75% LUDOX Silica Sol | 1 | 218 | 24.24 | 0.20 |
| 40% 200-Silica, 35% LUDOX | 2 | 198 | 24.23 | 0.14 |
| 40% 200-Silica, 35% LUDOX | 3 | 208 | 24.23 | 0.14 |
| 40% 410-Silica, 35% LUDOX | 4 | 209 | 24.23 | 0.15 |
| 40% 410-Silica, 35% LUDOX | 5 | 214 | 24.23 | 0.16 |
| 40% IMSIL, 35% LUDOX | 6 | 159 | 24.25 | 0.13 |

Cracking tests were done in a fixed bed microactivity unit at 950° F. (510° C.), a 2.75 catalyst-to-oil ratio and a weight hourly space velocity (WHSV) of 32.7 using two feedstocks: a vacuum gas oil (VGO) with a concarbon residue of 0.35 wt % and a blend of 50% vacuum resid (1050° F.+) with 50% vacuum gas oil (concarbon residue of 7.0 wt %). To examine the catalyst activity differences, 650° F. activities were calculated using the second order expression X/(100-X) where X is the 650° F. conversion and is defined as the 650° F.+ molecules converted to 650° F.− products not including coke. Tables 2 (for VGO) and 3 (for VGO/resid blend) show that the addition of the silica gels significantly enhanced the cracking of 650° F. molecules. The 650° F. activities were increased 25–40% over Catalyst 1 which did not contain silica gel. The catalyst that contained the diatomaceous earth silica component instead of a silica gel component showed much poorer performance. It is an unexpected result that an inert material such as silica gel can significantly enhance the cracking of large molecules in vacuum gas oils and resid/vacuum gas oil blends. Additionally, Tables 2 and 3 show that the catalysts with the silica gel components also gave the lowest amount of coke per unit of activity.

TABLE 2

| (Vacuum Gas Oil) Catalysts contain 25% USY and: | Catalyst | 650° F. Conversion | 650° F. Activity | % Increase over Base Catalyst Activity | Coke/ 650° F. Activity |
|---|---|---|---|---|---|
| 75% LUDOX (Base Catalyst) | 1 | 61.3 | 1.58 | — | 0.82 |
| 40% 200-Silica, 35% LUDOX | 2 | 66.3 | 1.97 | +25% | 0.69 |
| 40% 410-Silica, 35% LUDOX | 4 | 68.8 | 2.21 | +40% | 0.61 |
| 40% IMSIL, 35% LUDOX | 6 | 52.7 | 1.11 | −30% | 1.07 |

TABLE 3

| (VGO/Resid Blend) Catalysts contain 25% USY and: | Catalyst | 650° F. Conversion | 650° F. Activity | % Increase over Base Catalyst Activity | Coke/ 650° F. Activity |
|---|---|---|---|---|---|
| 75% LUDOX (Base Catalyst) | 1 | 62.5 | 1.67 | — | 4.7 |
| 40% 200-Silica, 35% LUDOX | 3 | 68.9 | 2.22 | +33% | 3.8 |
| 40% 410-Silica, 35% LUDOX | 5 | 67.8 | 2.10 | +26% | 4.0 |
| 40% IMSIL, 35% LUDOX | 6 | 57.2 | 1.34 | −20% | 4.9 |

EXAMPLE 3

This example illustrates the benefits of a rare earth exchanged USY zeolite. Seven catalysts were made with 25 wt % zeolite in a silica matrix made by using the LUDOX silica sol as described in Example 1. The catalysts consisted of USY zeolite (Catalysts 1 and 7), LZ-210 (Catalyst 8), REUSY (Catalysts 9 and 10) and CREY (Catalysts 11 and 12). Two additional catalysts were made with 40% REUSY (Catalyst 13) and 50% REUSY (Catalyst 14) zeolite in a silica matrix made by using the LUDOX silica sol. The cracking tests were done in a fixed bed microactivity unit at 950° F. (510° C.), a 2.75 catalyst-to-oil ratio and a weight hourly space velocity (WHSV) of 32.7 using a blend of 50% vacuum resid (1050° F.+) with 50% vacuum gas oil.

The 650° F. bottoms activity is plotted versus the hydrothermally equilibrated unit cell size of the catalysts in FIG. 1. For the catalysts with 25% zeolite, FIG. 1 clearly shows that the bottoms cracking activity is maximized for the catalyst with the REUSY zeolite with an equilibrated unit cell size of 24.32 Å. For higher percentages of REUSY zeolite, the bottoms cracking activity was further increased. At the 50% zeolite level, the conversion to 650° F.− products was 82.3% which is approaching the calculated maximum conversion for the feed, 88.3%. Similar results were obtained for a 650°–1050° F. vacuum gas oil. This example shows that the REUSY in a silica matrix (i.e. no active component in the matrix) is especially effective in cracking large 650° F.+ molecules in heavy resid feeds and that increasing the amount of zeolite increases further the amount of 650° F.+ material converted to 650° F.− products.

EXAMPLE 4

For the all-silica matrix catalysts prepared in Example 3 containing 25% zeolite components, the product selectivities were calculated based on data obtained under constant conditions in the micro activity unit using the resid/vacuum gas oil blend as the feedstock. The results are given in Table 4.

TABLE 4

| Zeolite (Silica Matrix) | Catalyst | Equilibrated Unit Cell Å | Specific $H_2$ $H_2$ / (X / 100 − X)* | Specific $C_2$− gas $C_2$− / (X / 100 − X) | Specific Coke Coke / (X / 100 − X) | (Naphtha)/ (Coke + $C_2$− gas) |
|---|---|---|---|---|---|---|
| USY | 1 | 24.24 | 2.61 | 1.09 | 3.77 | 4.01 |
| LZ-210 | 8 | 24.25 | 1.87 | 1.04 | 3.61 | 4.00 |
| REUSY | 9 | 24.31 | 0.82 | 0.63 | 2.44 | 4.56 |
| CREY | 11 | 24.43 | 2.69 | 2.10 | 8.55 | 2.42 |

*X is the conversion to 650° F.-products. Coke is not included as a 650° F.-product.

Table 4 shows that the specific hydrogen, specific $C_2$- gas and specific coke are the lowest for the REUSY/silica catalyst. Also, the ratio of desired naphtha product to undesired coke+ gas was the best for the REUSY catalyst. These results demonstrate the REUSY all-silica matrix catalyst is the most effective.

EXAMPLE 5

This example illustrates the cracking activity of the silica binder without any zeolite component as compared to other matrices that have added alumina. Table 5 describes the three catalysts that were made by using the methods in Example 1 but no zeolites were added. The cracking tests were done in a fixed bed microactivity unit at 950° F. (510° C.), a 2.75 catalyst-to-oil ratio and a weight hourly space velocity (WHSV) of 32.7 using the VGO feedstock. Table 5 shows that the silica binder had very low 650° F. activity compared to matrices with active alumina components.

TABLE 5

| Catalyst Description | Catalyst Number | 650° F. Conversion | 650° F. Activity |
|---|---|---|---|
| 100% LUDOX | 15 | 3.9 | 0.04 |
| 50% Silica-Alumina, 50% LUDOX | 16 | 48.7 | 0.95 |
| 50% Alumina, 50% LUDOX | 17 | 70.0 | 2.3 |

What is claimed is:

1. A catalytic cracking process for cracking the 650° F.+ portion in a heavy feed to lighter products while providing improved coke selectivity which comprises: contacting the heavy feed with a catalytic cracking catalyst under catalytic cracking conditions wherein the catalytic cracking catalyst comprises a Y zeolite in a silica binder that is substantially free of catalytically active alumina and which further contains silica gel as a component, wherein said silica gel has a particle size of from 30 to 500 microns, a pore diameter of from 100 to 500 angstroms and a surface area of from 100 to 700 $m^2/g$.

2. The process of claim 1 wherein the Y zeolite is an ultra-stable Y zeolite.

3. The process of claim 1 wherein the Y zeolite is a rare-earth exchanged ultra-stable Y zeolite.

4. The process of claim 3 wherein the Y zeolite has a hydrothermally equilibrated unit cell size between 24.25 and 24.43 angstroms.

5. The process of claim 3 wherein the Y zeolite contains lanthanum, cerium or neodymium as rare earth.

6. The process of claim 1 wherein the catalyst contains from 1 to 50 wt. % of silica gel, based on catalyst composition.

7. The process of claim 1 wherein the binder contains less than about 3 wt. %, based on binder, of catalytically active alumina.

8. The process of claim 1 wherein the binder contains less than about 1 wt. %, based on binder, of catalytically active alumina.

* * * * *